United States Patent [19]
Lin et al.

[11] Patent Number: 5,831,800
[45] Date of Patent: Nov. 3, 1998

[54] MINIATURE TRANSFORMER FOR READ/WRITE TRANSDUCER

[75] Inventors: Fong-Jei Lin; Shengbo Zhu, both of San Jose, Calif.

[73] Assignee: Magnex Corporation, San Jose, Calif.

[21] Appl. No.: 878,701

[22] Filed: May 5, 1992

[51] Int. Cl.$^6$ ...................................................... G11B 5/17
[52] U.S. Cl. ............................................................ 360/123
[58] Field of Search ............................ 336/212; 360/123, 360/126

[56] References Cited

U.S. PATENT DOCUMENTS

| | | | |
|---|---|---|---|
| 4,743,988 | 5/1988 | Sato et al. ................................ | 360/126 |
| 4,745,506 | 5/1988 | Nakamura et al. ..................... | 360/126 |
| 4,787,003 | 11/1988 | Nakamura et al. ..................... | 360/126 |
| 4,927,804 | 5/1990 | Zieren et al. ............................ | 505/1 |
| 5,072,324 | 12/1991 | Lin et al. ................................. | 360/126 |
| 5,173,826 | 12/1992 | Bischoff ................................... | 360/126 |

Primary Examiner—Stuart S. Levy
Assistant Examiner—George Letscher
Attorney, Agent, or Firm—Graham & James LLP

[57] ABSTRACT

A thin film transformer with improved magnetic properties has a bottom pole member supported over a substrate, a top pole member and an intermediate multi-turn thin film coil. The top and bottom pole members form a closed magnetic path, and the coil surrounds one of the legs of the magnetic path. The top pole member, the bottom pole member or both are formed as a plurality of individual laterally spaced pole elements each forming a closed magnetic path with the other pole member. The lateral spacing of the pole elements substantially reduces eddy current build-up in the magnetic path.

The bottom pole member in the region of the leg encircled by the coil has a plurality of spaced support members and the top pole element is formed over the support members to provide additional magnetic material at the join site.

19 Claims, 3 Drawing Sheets

MINIATURE TRANSFORMER FOR READ/WRITE TRANSDUCER

CROSS-REFERENCE TO RELATED APPLICATION

This application is directed to an invention related to that invention described in our co-pending U.S. patent application Ser. No. 07/879,405 for "MINIATURE TRANSFORMER/TRANSDUCER WITH IMPROVED PROPERTIES" filed May 5,1992.

BACKGROUND OF THE INVENTION

This invention relates to miniature magnetic transducers and transformers for use in computer disk drives.

Thin film magnetic transducers are known which are used in disk drives to write data to and read data from magnetic storage disks. A typical thin film transducer comprises a pair of pole pieces joined at a first region, usually termed the back gap region, and spaced at an opposing region, usually termed the pole tip region. In between the back gap region and the pole tip region, the pole pieces diverge in order to accommodate an electrical coil which is electrically insulated from the pole pieces. The coil is electrically connected to associated read/write circuitry. The transducer is typically fabricated on a relatively thick substrate, usually termed a slider, using thin film photolitographic techniques. Fabrication usually proceeds by depositing successive layers of appropriate materials on a starting substrate surface and patterning each layer using photoresist techniques in order to produce a complete magnetic transducer. In the completed transducer, the pole tip region typically terminates at a surface termed the air bearing surface (ABS). A typical example of such a transducer is described and illustrated in U.S. Pat. No. 5,072,324 and the additional references cited therein, the disclosures of which are hereby incorporated by reference.

In a typical prior art structure, a pair of such thin film transducers is fabricated on the slider surface, with each transducer located at a different end of the slider surface adjacent a lobe defined by a rail extending the entire length of the slider. Thus, in a given assembly the slider has a pair of rails running mutually parallel along the length of the slider and a thin film transducer is associated to the lobe defined by the associated rail.

The demand for increasing data density on magnetic media has led to the requirement for substantially smaller track widths and transducers with correspondingly smaller pole tip regions. With decreasing pole tip size, the amplitude of the signal output by the transducer coil during a read operation is correspondingly reduced. This is undesirable, since noise signals increasingly mask the data signals generated by the coils during a read operation, which leads to erroneous data retrieval. In addition, the reduction in physical size of the transducer has led to a reduction in the magnitude in the magnetic signal produced at the pole tip region during recording, which is similarly undesirable. Efforts to reduce these adverse effects inherent in decreasing size of the transducer have in the past largely centered around providing more coil turns in a given coil layer for the transducer, and further by adding more coil layers. These attempted solutions lead to additional fabrication, yield and performance problems.

Another solution to the problem of diminished performance of smaller transducers has been the provision of a separate thin film transformer adjacent the transducer on the same substrate, or in close proximity thereto, in order to boost the amplitude of the electrical output signals during a read operation and to increase the amount of current produced in the transducer coil during a write operation. An example of such an arrangement is shown in the above-referenced U.S. Pat. No. 5,072,324 in which a thin film transformer is substituted for one of the transducers on the slider surface. While effective in many applications, increasing industry demands for even smaller track widths and increasing magnetic data density have given rise to the requirement for an even more efficient transformer/transducer arrangement.

SUMMARY OF THE INVENTION

The invention comprises an improved transformer with enhanced magnetic properties which improve the performance of the thin film transducer/transformer arrangement.

From an apparatus standpoint, the invention comprises a thin film magnetic transformer assembly including a bottom pole member formed over a support surface of a substrate, a top pole member and an intermediate electrically conductive coil insulated from the top and bottom pole members. The top and bottom pole members form a closed magnetic path having two longitudinally spaced magnetic contact regions, and the coil encloses one of the magnetic contact regions. The top pole member, the bottom pole member or both are formed as a plurality of laterally spaced individual pole elements each forming a closed magnetic path with the other pole member. The lateral spacing of the individual pole elements substantially reduces the incidence of eddy current build-up in the magnetic path.

Each of the individual pole elements is arranged in close magnetic contact with the adjacent portion of the other pole member at a plurality of join sites separated by at least one support member, with the portion of each individual pole element adjacent the join sites extending over the support member to provide additional magnetic material for the magnetic path.

From another apparatus aspect, the invention comprises a thin film transducer/transformer assembly including a substrate providing a support surface, a thin film magnetic transducer formed at a first location of the support surface, the transducer including an electrically conductive coil having a pair of ends, a thin film transformer formed at a second location of the support surface, the transformer including a coil having a pair of ends and an intermediate tap connection, and means for providing electrical coupling between the transducer and the transformer. The transformer includes a bottom pole member, a top pole member forming a closed magnetic path with the bottom pole member, the top and bottom pole members being fabricated of a magnetically permeable material, and one of the top and bottom pole members comprising a pair of laterally spaced individual pole elements. The coupling means includes a first conductive path coupled between one of the transducer coil ends and one of the transformer coil ends and a second conductive path coupled between the other one of the transducer coil ends and the tap connection of the transformer coil.

From another aspect, the invention comprises the method of forming a thin film transformer assembly comprising the steps of providing a substrate having a support surface, forming a bottom pole member of a magnetic permeable material having a pair of spaced magnetic contact regions over the substrate support surface, forming an electrically conductive coil over the bottom pole member and enclosing one of the magnetic contact regions, and forming a top pole member having a pair of spaced magnetic regions over the coil and in close magnetic contact with the bottom pole member in the spaced magnetic contact regions thereof. The method further includes the steps of forming either the bottom pole member or the top pole member or both as a plurality of laterally spaced pole elements each forming a closed magnetic path with the other pole member. The method further comprises the steps of providing a plurality of laterally spaced support members over the bottom pole member at the magnetic contact region enclosed by the coil, exposing portions of the bottom pole member adjacent the spaced support members, and forming the top pole member over the exposed portions of the bottom pole member and the support members to provide additional magnetic material in the magnetic contact region.

The invention provides a thin film transformer assembly having substantially improved magnetic properties including substantially increased inductance due to the increased volume of magnetic material, as well as reduced susceptibility to eddy current generation due to the provision of the laterally spaced individual pole elements for either the top pole member, the bottom pole member or both.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
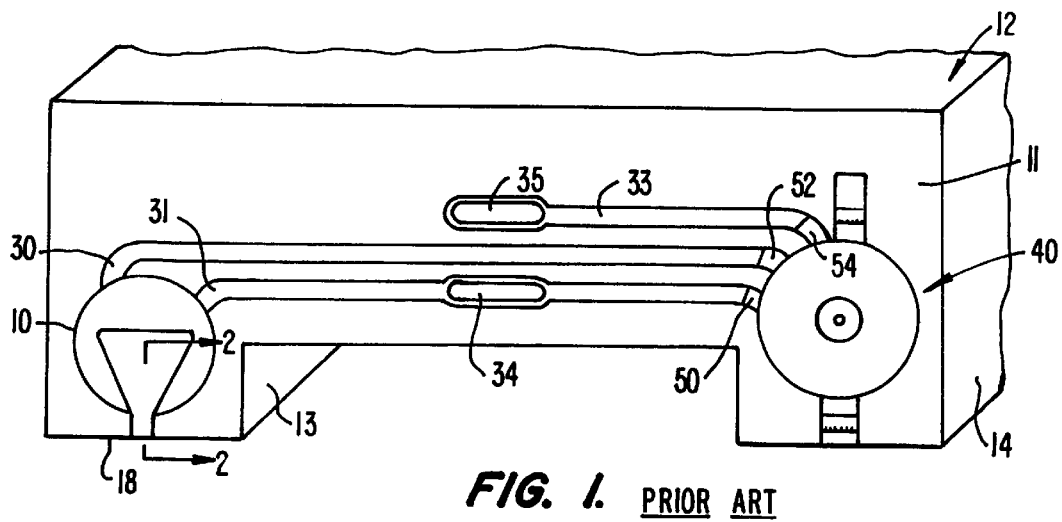
FIG. 1 is an isometric representation viewed from the upstream side of a slider depicting a prior art transducer/transformer assembly.

Turning now to the drawings, FIG. 1 illustrates the prior art arrangement employing a transducer/transformer assembly. As seen in this Fig., a thin film magnetic transducer generally designated with reference numeral 10 and a thin film transformer generally designated with reference numeral 40 are formed on a support surface 11 of a slider 12. Slider 12 includes first and second bearing rails 13, 14 which are integrally formed with the slider 12 and which provide air bearing surfaces for supporting the slider 12 above a moving magnetic disk (not shown) in a known manner.

Figure 2:
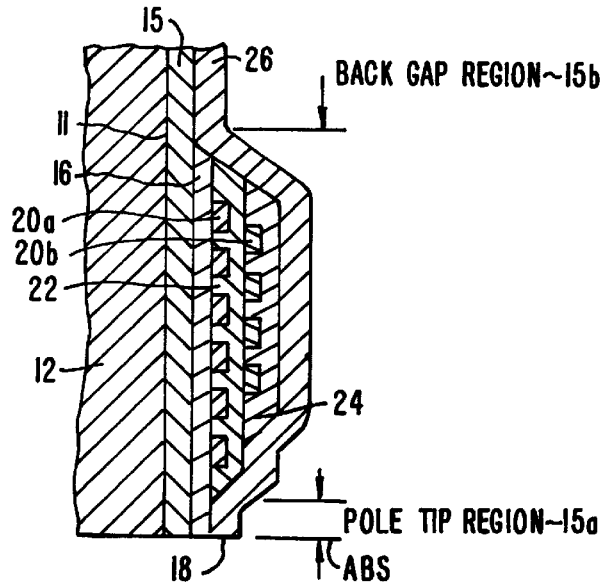
FIG. 2 is an enlarged sectional view illustrating the thin film transducer taken along lines 2—2 of FIG. 1.

As best seen in FIG. 2, thin film transducer 10 includes a first layer of magnetic film material forming a first magnetic pole piece 15 disposed on surface 11 of slider substrate 12. First magnetic pole piece 15 is typically of uniform thickness between at least a pole tip region 15a and a back gap region 15b. A first layer of non-magnetic insulating material 16 such as silicon dioxide or alumina is deposited over pole piece 15 and extends from pole tip region 15a to back gap region 15b.

A first layer of electrically conductive material forming a conductive coil winding 20a is deposited in an appropriate pattern, such as rectangular, circular or elliptical, over the layer of insulating material 16. A second layer of insulating material 22 of sufficient thickness to cover winding 20a is deposited over insulating layer 16. A second layer of electrically conductive material forming a further conductive coil winding 20b is deposited in a suitable pattern over the layer of insulating material 22. A third insulating layer 24 covers the second winding 20b. First and second windings 20a and 20b are connected to form a two layer continuous coil which loops around the back gap region 15b to enclose the region 15b.

A second layer of magnetic material forming a second magnetic pole piece 26 is deposited over first pole piece 15 in the back gap region 15b, over insulating layers 22 and 24 in the regions occupied by conductive windings 20a and 20b and over insulating layer 16 in the pole tip region 15a. Pole pieces 15 and 26 are separated at the pole tip region by insulating layer 16 in order to provide a transducing gap therebetween. One end of first winding 20a and one end of second winding 20b are electrically coupled to the first end of separate electrically conductive paths 30, 31 (FIG. 1) in order to electrically connect the coil of the transducer 10 to the coil in transformer 40, as described more fully below.

Figure 3:
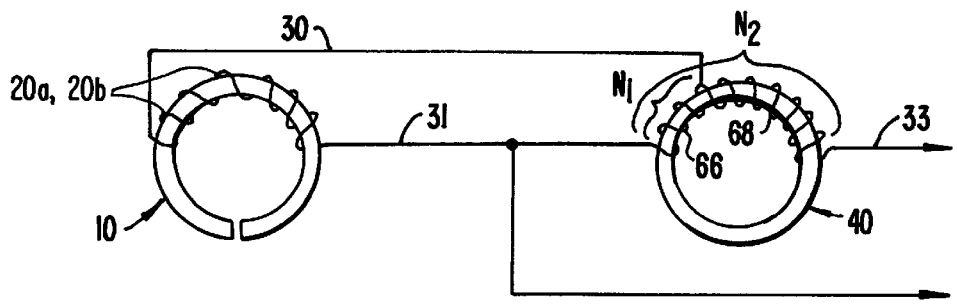
FIG. 3 is an electrical diagram showing the coupling between the transducer and the transformer of FIG. 1.

With reference to FIGS. 1 and 3, transformer 40 is similar in structure to transducer 10, with the major difference being the absence of a pole tip region and gap. Instead, the transformer 40 is constructed as a thin film version of a magnetic core transformer providing a closed magnetic path between the top and bottom pole layers. The structure of transformer 40 is more specifically described in the above-referenced U.S. Pat. No. 5,072,324.

The transformer 40 includes a pair of electrically conductive coil segments 66, 68 (see FIG. 3). The lower coil segment 66 is coupled to a first contact pad 50; the tap connection between segments 66, 68 is coupled to a second contact pad 52; and coil segment 68 is coupled at the other end to a third contact pad 54. As best shown in FIG. 3, the coil segments 20a, 20b of thin film transducer 10 are electrically connected to coil segment 66 of transformer 40 via conductive leads 30, 31; while the upper connections to the follow-on electronic circuitry (not shown) are taken from the non-common ends of coil segments 66 and 68 along conductive paths 31, 33. To facilitate connection to the external circuitry, enlarged electrical contact areas 34, 35 are provided as shown in FIG. 1.

Transformer 40 is used to modify the signals generated by transducer 10 on conductive paths 30, 31 during a read operation; and is used to increase the current supplied to transducer 10 from the external circuitry via conductive paths 31, 33 during a write operation. More particularly, during a read operation the voltage level of the signals from transducer 10 is stepped up or boosted by transformer 40. The amount of boost in the signal level is determined by the turns ratio of the coil segments 66, 68. With the configuration depicted in FIG. 3, the number of turns N1 on the signal input side is simply the number of turns in coil segment 66, while the number of turns N2 on the signal output side is the combined value of the number of turns in coil segment 66 and coil segment 68. These numerical values can be determined in an empirical fashion for any given application.

Figure 4:
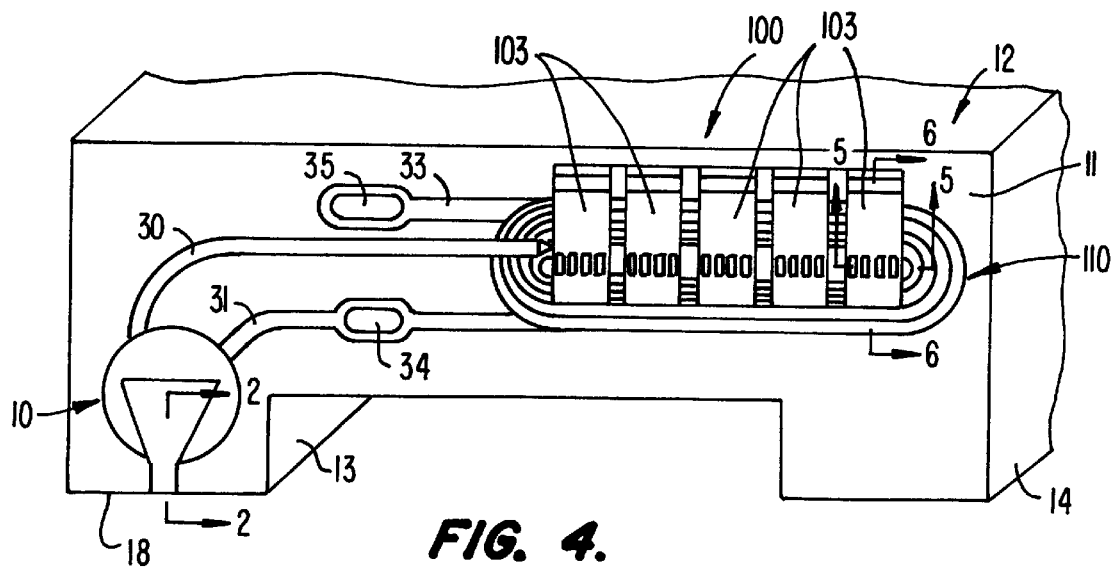
FIG. 4 is a view similar to FIG. 1 illustrating the invention.
Figure 5:
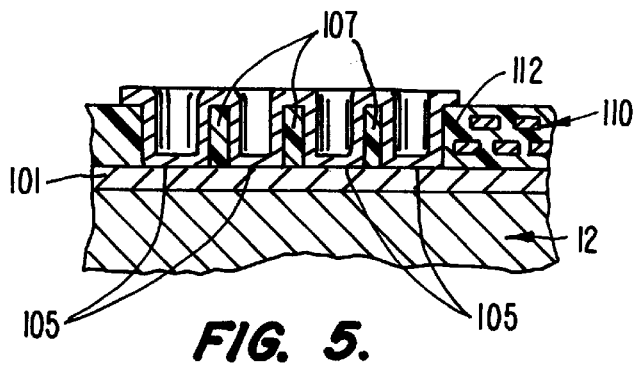
FIG. 5 is an enlarged sectional view taken along lines 5—5 of FIG. 4 illustrating the back gap contact region.
Figure 6:
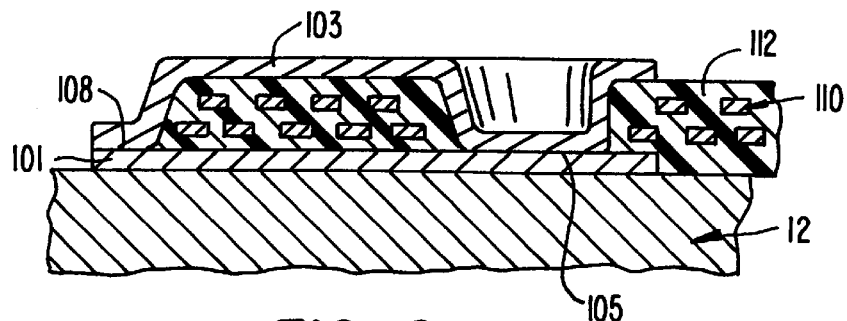
FIG. 6 is an enlarged sectional view taken along lines 6—6 of FIG. 4.

FIG. 4 is a view similar to FIG. 1 illustrating the invention. In this Figure, like reference numerals denoting common elements from FIGS. 1–3 are employed. Thus, in FIG. 4, the transducer 10 is seen mounted in the same relative position as in FIG. 1, with the coil ends of transducer 10 being connected to conductive paths 30, 31. Also, enlarged electrical contact areas 34, 35 are provided to facilitate connection to the external circuitry. Formed on surface 11 of slider 12 is an improved transformer generally designated with reference numeral 100. With reference to FIGS. 4-6, transformer 100 includes a bottom pole 101 and a top pole having a plurality of individual mutually spaced pole elements 103. In the embodiment shown, the bottom pole 101 has a rectangular shape substantially coextensive with the rectangular perimeter defined by the individual top pole elements 103. As best seen in FIG. 5, each pole element 103 is formed to be in direct contact with the underlying portion of bottom pole member 101 at a plurality of sites 105 which are separated by individual support elements 107. As best seen in FIG. 6, the outer ends of the individual top pole elements 103 are joined to the underlying portion of bottom pole member 101 in a region 108 so that a closed magnetic path is provided between each top pole element 103 and the bottom pole member 101.

An elongate electrically conductive multi-turn coil 110 is arrayed as depicted in FIGS. 4–6 so as to be wound about the collection of join sites 105. Thus, the upper branch of coil 110 as shown in FIG. 4 passes within the closed magnetic loop between each of the top pole elements 103 and the bottom pole member 101. As best seen in FIGS. 5 and 6, coil 110 comprises a plurality of layers (two illustrated) embedded in an electrically insulating material 112 so as to be electrically insulated from the magnetic structure.

The transformer 100 is fabricated using conventional photolithographic process steps which are well known in the art. Also, transformer 100 can be formed contemporaneously with the formation of transducer 10, since both structures require a bottom pole member, intermediate coil and insulating layers and a top pole member. Focusing on the transformer 100 elements, the bottom pole magnetic layer is first deposited over the top surface 11 of substrate 12, after which the layer is patterned in a rectangular shape. Next, a first insulative layer is deposited, after which the first lower layer of coil 110 is formed. Thereafter, a second layer of insulating material is formed over the lower coil layer, after which the upper coil layer is formed. Next, the top electrically insulative layer is deposited over the top coil layer. Thereafter, the voids in the insulative layer 112 are formed to expose the sites 105. In this process, support elements 107, which are ribs extending across the voids provided for the sites 105, are formed. Next, the upper magnetic pole layer is deposited, which is followed by patterning of the upper pole elements 103. During the formation of the transformer 100, the conductive paths 30, 31, 33 and the enlarged contact pads 34, 35 are similarly formed of electrically conductive material. If desired, a passivation layer (not shown) can be provided over the entire structure of transformer 100, transducer 10, or both.

The transformer structure described above provides substantially enhanced magnetic properties over known thin film transformers. Firstly, the total amount of magnetic material is substantially increased due to the large rectangular area circumscribed by the individual top pole elements 103 and the bottom pole member 101. In addition, the serpentine arrangement of the magnetic top pole element joining layer adjacent sites 105 provides an additional volume of magnetic material. For example, in a device fabricated in accordance with the invention the inductance was measured to be about two microhenries, which is substantially above a value of about 300 nanohenries believed typical for prior art transformers of the type shown in FIG. 1. Further, by providing the non-magnetic gaps between the individual pole elements 103, the incidence of eddy current generation is substantially reduced, which further improves the magnetic performance of the thin film transformer.

Figure 7:
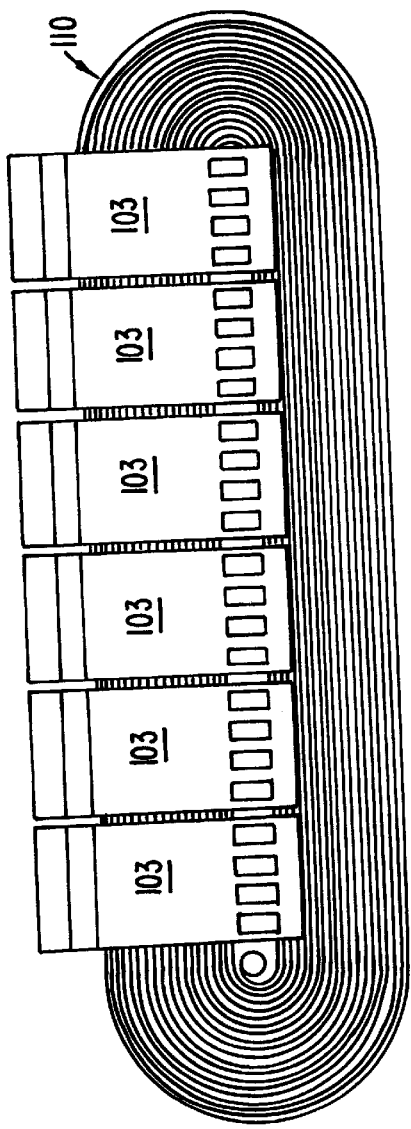
FIG. 7 is an enlarged top plan view showing an upper coil layer and an upper pole structure of an alternate embodiment of the invention of FIGS. 4–6.
Figure 8:
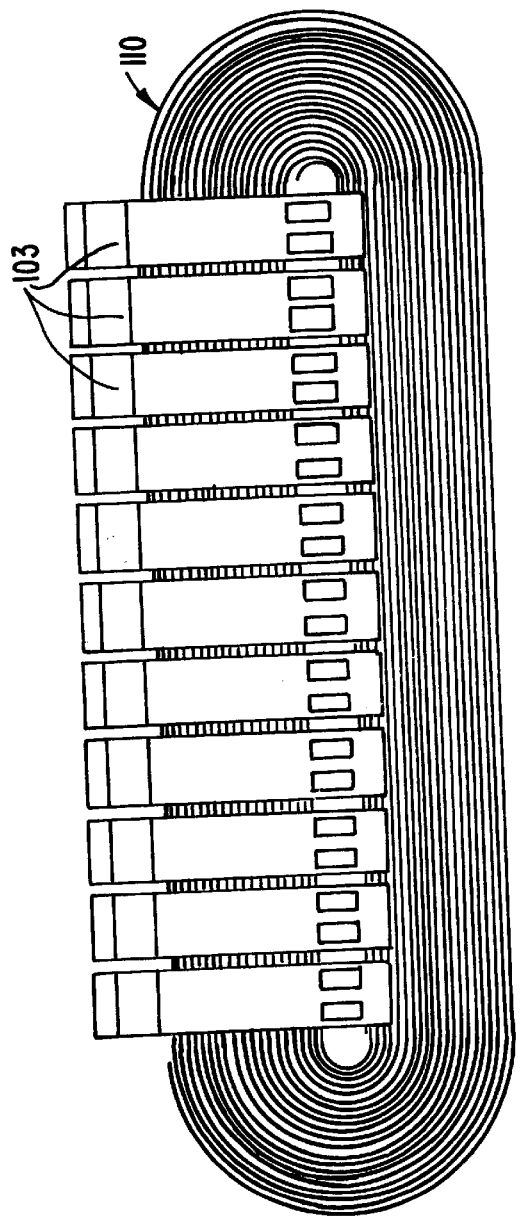
FIG. 8 is an enlarged top plan view of another alternate embodiment of the invention showing the upper coil layer and upper pole structures.

FIGS. 7 and 8 illustrate two different configurations for the top pole elements 103 of the transformer 100. In FIG. 7, each top pole element 103 has four join sites near the bottom end thereof, and there are a total of six individual top pole elements 103. In FIG. 8, the width of each of the top pole elements 103 is substantially narrower than those of the FIG. 7 embodiment, and the number of join sites is correspondingly reduced to two. Other configurations are possible, and it should be noted that the bottom pole member 101 may also be formed of individual elements similar to top pole elements 103, either the same in number or different numbers.

While the above provides a full and complete disclosure of the preferred embodiments of the invention, various modifications, alternate constructions and equivalents will occur to those skilled in the art. For example, while the transformer 100 has been illustrated as being formed on the same surface as the transducer 10, in some applications it might be desirable to form the transformer on a different surface of the slider 12 or on the surface of a separate discrete support element. Therefore, the above should not be construed as limiting the invention, which is defined by the appended claims.

What is claimed is:

1. A thin film transformer assembly having enhanced magnetic properties, said assembly comprising:
   a bottom pole member;
   a top pole member forming a closed magnetic path with said bottom pole member at two spaced regions, said top and bottom pole members being fabricated of a magnetically permeable material, one of said top and bottom pole members comprising a plurality of laterally spaced individual pole elements separated by a substantially magnetically impermeable gap; and
   an electrically conductive coil having a plurality of turns positioned between said top and bottom pole members.

2. The invention of claim 1 wherein said top pole member includes said plurality of laterally spaced individual pole elements.

3. The invention of claim 2 wherein each of said individual pole elements is arranged in close magnetic contact at at least one of said two spaced regions with the adjacent portion of the bottom pole member at a plurality of join sites separated by a support member, the portion of an individual pole element adjacent the join sites extending over the support member to provide additional magnetic material in one of the two regions of close magnetic contact.

4. The invention of claim 1 wherein said bottom pole member includes said plurality of laterally spaced individual pole elements.

5. The invention of claim 4 wherein each of said individual pole elements is arranged in close magnetic contact at at least one of said two spaced regions with the adjacent portion of the top pole member at a plurality of join sites separated by a support member, the portion of the top pole member adjacent the join sites extending over the support member to provide additional magnetic material in one of the regions of close magnetic contact.

6. The invention of claim 1 further including a thin film magnetic transducer having an electrically conductive coil, and means for providing electrical coupling between the transducer coil and the transformer coil.

7. A thin film transducer/transformer assembly comprising:
   a substrate providing a support surface;
   a thin film magnetic transducer formed at a first location of said support surface, said transducer including an electrically conductive coil having a pair of ends;
   a thin film transformer formed at a second location of said support surface, said transformer including a bottom pole member, a top pole member forming a closed magnetic path with said bottom pole member at two spaced regions, said top and bottom pole members being fabricated of a magnetically permeable material, one of said top and bottom pole members comprising a plurality of laterally spaced individual pole elements separated by a substantially magnetically impermeable gap, and an electrically conductive coil having a plurality of turns positioned between said top and bottom pole members; and
   means for providing electrical coupling between the transducer coil and the transformer coil.

8. The invention of claim 7 wherein said transformer top pole member includes said plurality of laterally spaced individual pole elements.

9. The invention of claim 8 wherein each of said individual pole elements is arranged in close magnetic contact at at least one of said two spaced regions with the adjacent portion of the bottom pole member at a plurality of join sites separated by a support member, the portion of said individual pole element adjacent the join sites extending over the support member to provide additional magnetic material in one of the regions of close magnetic contact.

10. The invention of claim 7 wherein said bottom pole member includes said plurality of laterally spaced individual pole elements.

11. The invention of claim 10 wherein each of said individual pole elements is arranged in close magnetic contact at at least one of said two spaced regions with the adjacent portion of the top pole member at a plurality of join sites separated by a support member, the portion of said top pole member adjacent the join sites extending over the support member to provide additional magnetic material in one of the regions of close magnetic contact.

12. The invention of claim 7 wherein said transducer coil has a pair of ends, said transformer coil has a pair of ends and a tap connection therebetween; and wherein said coupling means includes a first conductive path coupled between one of said transducer coil ends and one of said transformer coil ends and a second conductive path coupled to the other one of said transducer coil ends and said tap connection of said transformer coil.

13. A method of forming a thin film transformer assembly comprising the steps of:
   (a) providing a substrate having a support surface;
   (b) forming a bottom pole member of a magnetic permeable material having a pair of spaced magnetic contact regions over said substrate support surface;
   (c) forming an electrically conductive coil over said bottom pole member and enclosing one of said magnetic contact regions; and
   (d) forming a top pole member having a pair of spaced magnetic contact regions over the coil and in close magnetic contact with the bottom pole member in the spaced magnetic contact regions thereof, said step (d) of forming including the step of providing a plurality of laterally spaced top pole elements separated by a substantially magnetically impermeable gap, each element forming a closed magnetic path with the bottom pole member.

14. The invention of claim 13 wherein said step (d) of forming includes the steps of providing a plurality of laterally spaced support members over one of said pair of magnetic contact regions of said bottom pole member, exposing portions of the bottom pole member adjacent the spaced support members and forming the top pole member over the exposed portions of the bottom pole member and the support members to provide additional magnetic material in that region of close magnetic contact.

15. The method of claim 13 wherein said step (c) of forming includes the steps of forming a first insulative layer over the bottom pole member, forming a first coil segment over the first insulating layer, forming a second insulating layer over the first coil segment, forming an intermediate tap element over the second insulating layer, forming a third insulating layer over the intermediate tap element, forming a second coil segment over the third insulating layer, and forming a fourth insulating layer over the second coil segment.

16. A method of forming a thin film transformer assembly comprising the steps of:
   (a) providing a substrate having a support surface;
   (b) forming a bottom pole member of a magnetically permeable material having a pair of spaced magnetic contact regions over said substrate support surface;
   (c) forming an electrically conductive coil over said bottom pole member and enclosing one of said magnetic contact regions; and
   (d) forming a top pole member having a pair of spaced magnetic contact regions over the coil and in close magnetic contact with the bottom pole member in the spaced magnetic contact regions thereof,
      said step (b) of forming including the step of providing a plurality of laterally spaced bottom pole elements separated by a substantially magnetically impermeable gap, each element forming a closed magnetic path with the top pole member.

17. The method of claim 16 wherein said step (d) of forming includes the steps of providing a plurality of laterally spaced support members over one of said pair of magnetic contact regions of said bottom pole elements, exposing portions of the bottom pole elements adjacent the spaced support members and forming the top pole member over the exposed portions of the bottom pole elements and the support members to provide additional magnetic material in that region of close magnetic contact.

18. A method of forming a thin film transformer assembly comprising the steps of:
   (a) providing a substrate having a support surface;
   (b) forming a bottom pole member of a magnetic permeable material having a pair of spaced magnetic contact regions over said substrate support surface;
   (c) forming an electrically conductive coil over said bottom pole member and enclosing one of said magnetic contact regions; and
   (d) forming a top pole member having a pair of spaced magnetic contact regions over the coil and in close magnetic contact with the bottom pole member in the spaced magnetic contact regions thereof,
      said steps (b) and (d) of forming including the steps of providing a plurality of laterally spaced pole elements separated by a substantially magnetically impermeable gap, each pole element associated to the bottom pole member forming a closed magnetic path with a pole element associated to the top pole member.

19. The method of claim 18 wherein said step (d) of forming includes the step of providing a plurality of laterally spaced support members over one of said pair of magnetic contact regions of said bottom pole member, exposing portions of the bottom pole member adjacent the spaced support members, and forming the top pole member over said exposed portions and said spaced support members to provide additional magnetic material adjacent that region of close magnetic contact.

* * * * *